US010472211B2

(12) United States Patent
Park

(10) Patent No.: US 10,472,211 B2
(45) Date of Patent: Nov. 12, 2019

(54) PEOPLE CONVEYOR

(71) Applicant: Otis Elevator Company, Farmington, CT (US)

(72) Inventor: Chan-Jong Park, Vienna (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/987,270

(22) Filed: May 23, 2018

(65) Prior Publication Data

US 2018/0339885 A1 Nov. 29, 2018

(30) Foreign Application Priority Data

May 24, 2017 (EP) ..................... 17172840

(51) Int. Cl.
B66B 29/00 (2006.01)
B66B 23/02 (2006.01)
B66B 21/04 (2006.01)
B66B 21/10 (2006.01)
B66B 25/00 (2006.01)
B66B 27/00 (2006.01)
F16H 7/06 (2006.01)
G01G 19/52 (2006.01)

(52) U.S. Cl.
CPC .............. B66B 29/00 (2013.01); B66B 21/04 (2013.01); B66B 21/10 (2013.01); B66B 23/02 (2013.01); B66B 23/026 (2013.01); B66B 25/00 (2013.01); B66B 27/00 (2013.01); F16H 7/06 (2013.01); G01G 19/52 (2013.01)

(58) Field of Classification Search
CPC ......... B66B 29/00; B66B 21/10; B66B 21/04; B66B 23/026; B66B 23/02; B66B 25/00; B66B 27/00; G01G 19/52; F16H 7/06
See application file for complete search history.

(56) References Cited

U.S. PATENT DOCUMENTS

| 4,071,116 A | 1/1978 | Halperin et al. |
| 4,330,836 A | 5/1982 | Donofrio et al. |
| 4,491,199 A | 1/1985 | Shea et al. |

(Continued)

FOREIGN PATENT DOCUMENTS

| DE | 3504751 A1 | 8/1986 |
| EP | 1939126 A1 | 7/2008 |

(Continued)

OTHER PUBLICATIONS

EMCO, "Load Weighing Controls", Elevator Motors/Materials Corporation, available at: http://www.elevatormotors.com/load_weighing_controls/index.html, accessed May 21, 2018, 2 pages.

(Continued)

*Primary Examiner* — William R Harp
(74) *Attorney, Agent, or Firm* — Cantor Colburn LLP

(57) ABSTRACT

A people conveyor (10) comprises a conveying band (12) including a plurality of conveying elements (13); a truss (8) supporting the conveying band (12); a motor (24), which is mounted to the truss (8) and which is configured for driving the conveying band (12); and a force sensor (26). The force sensor (26) is arranged between the motor (24) and the truss (8) and is configured for measuring a force which is exerted by the motor (24) on the truss (8).

12 Claims, 3 Drawing Sheets

(56) References Cited

U.S. PATENT DOCUMENTS

| | | | |
|---|---|---|---|
| 4,676,560 A * | 6/1987 | Schmitz | B65G 1/127 |
| | | | 198/794 |
| 4,793,442 A | 12/1988 | Heckler et al. | |
| 4,899,852 A | 2/1990 | Salmon et al. | |
| 4,939,679 A | 7/1990 | David et al. | |
| 5,090,551 A * | 2/1992 | Yasuhara | B66B 23/04 |
| | | | 198/323 |
| 5,402,861 A | 4/1995 | Kohara | |
| 5,421,433 A | 6/1995 | Yoo | |
| 6,273,235 B1 * | 8/2001 | Inoue | B66B 23/02 |
| | | | 198/330 |
| 6,305,503 B1 | 10/2001 | Suzuki et al. | |
| 6,435,035 B1 * | 8/2002 | Kubsik | B65G 23/14 |
| | | | 73/828 |
| 7,237,656 B2 | 7/2007 | Barrett et al. | |
| 7,784,589 B2 | 8/2010 | Fischer | |
| 8,162,110 B2 | 4/2012 | Smith et al. | |
| 2002/0183148 A1 * | 12/2002 | Goryca | B65G 43/02 |
| | | | 474/114 |
| 2008/0230322 A1 | 9/2008 | Chung | |

FOREIGN PATENT DOCUMENTS

| | | |
|---|---|---|
| JP | H0761755 A | 3/1995 |
| JP | 2014234267 A | 12/2014 |
| WO | 0138208 A1 | 5/2001 |

OTHER PUBLICATIONS

European Search Report for application EP 17172840.5, dated Dec. 15, 2017, 8 pages.

* cited by examiner

PEOPLE CONVEYOR

FOREIGN PRIORITY

This application claims priority to European Patent Application No. 17172840.5, filed May 24, 2017, and all the benefits accruing therefrom under 35 U.S.C. § 119, the contents of which in its entirety are herein incorporated by reference.

BACKGROUND

The invention relates to a people conveyor such as an escalator or moving walkway, in particular to a people conveyor comprising a load sensor which allows to provide real-time passenger load data.

Real-time passenger load data of a people conveyor such as an escalator or moving walkway provides information for remote monitoring and diagnosing the operation condition, which is important for maintenance and safety purposes. The electrical power of the motor driving the people conveyor may be measured for estimating the passenger load. Measurement of the motor power, however, needs dedicated equipment, which is expensive and needs additional installation space.

SUMMARY

It therefore is desirable to improve the determination of the passenger load of a people conveyor, in particular reducing the costs and the necessary installation space.

According to an exemplary embodiment of the invention, a people conveyor, such as an escalator or moving walkway, comprises a conveying band including a plurality of conveying elements, which are connected to each other by a conveying chain; a truss supporting the conveying band; a motor, which is mounted to the truss and which is configured for driving the conveying band; and at least one force sensor, which is arranged at a position between the motor and the truss and which is configured for measuring a force exerted by the motor on the truss.

According to an exemplary embodiment of the invention, a method of determining a load of a people conveyor, such as an escalator or moving walkway, comprising: a conveying band including a plurality of conveying elements, which are connected to each other by a conveying chain; a truss supporting the conveying band; and a motor, which is mounted to the truss and configured for driving the conveying band, comprises measuring a force which is exerted by the motor on the truss when driving the conveying band.

A force sensor, which is arranged between the motor and the truss, measures the force which is exerted by the motor on the truss when driving the conveying band. Thus, such a force sensor provides a reliable and convenient way of determining the force acting on the motor.

For providing a people conveyor according to exemplary embodiments of the invention, there is no need to change the configuration of existing people conveyor installations. Further, due to the compact design, the proposed solution requires only minimal additional space. The proposed solution results only in minor additional costs, in particular as an industry standard compression type load-cell may be employed as the force sensor.

BRIEF DESCRIPTION OF THE DRAWINGS

In the following, an exemplary embodiment of the invention is described in more detail with reference to the enclosed figures.

DETAILED DESCRIPTION

Figure 1:
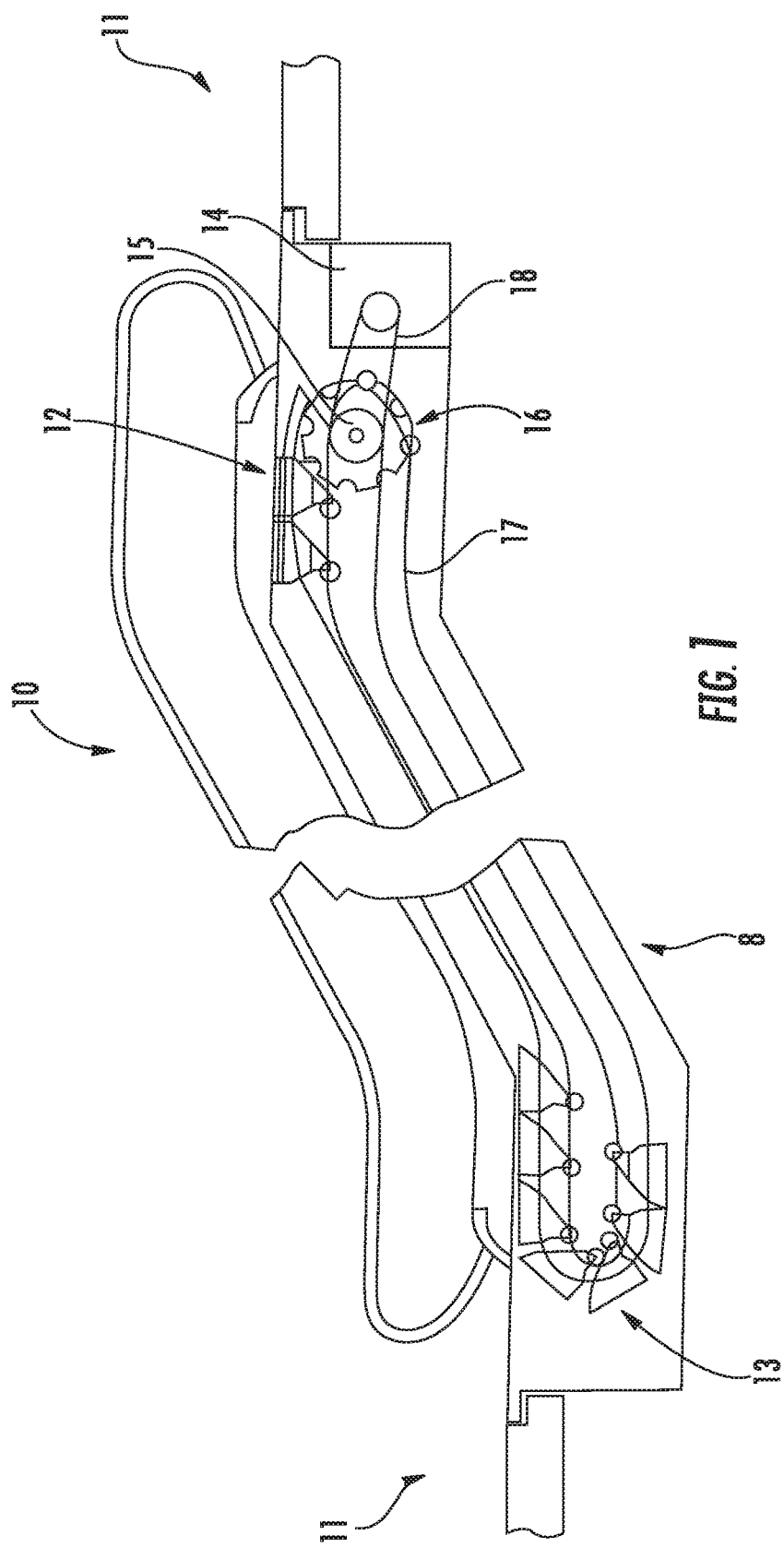
FIG. 1 shows a schematic side view of a people conveyor according to an exemplary embodiment of the invention.

FIG. 1 depicts a schematic side view of an exemplary embodiment of a people conveyor 10 comprising a truss 8 extending between two landing portions 11. The people conveyor 10 comprises a plurality of conveying elements 13. The conveying elements are connected to each other by a conveying chain 17 forming an endless conveying band 12. The conveying chain 17 is driven by a sprocket 16 ("conveying chain sprocket 16") which is mounted to a rotating shaft 15 forming a shaft and sprocket assembly.

A drive unit 14 is configured for rotatably driving the rotating shaft 15 via a transmission element 18, which may be a drive chain or belt. Rotating the rotating shaft 15 rotates the conveying chain sprocket 16 thereby driving the conveying chain 17. The shaft and sprocket assembly and the drive unit 14 are supported by the truss 8 extending between the two landing portions 11.

Although it is not visible in the figures, the skilled person will understand that a dual machine driving two drive chains 18, in particular two drive chains 18 extending on both lateral sides of the people conveyor 10, may be employed as the drive unit 14.

In the embodiment shown in FIG. 1, the people conveyor 10 is an escalator in which the conveying elements 13 are steps 13. The skilled person, however, will understand that exemplary embodiments of the invention may include different types of people conveyors 10, for example moving walkways comprising a plurality of pallets instead of steps 13. In case of a moving walkway, the conveying band 12 may extend horizontally between two landing portions 11, which are arranged at the same height. Alternatively, the conveying band 12 may be inclined with respect to the horizontal extending between two landing portions 11 arranged at different heights.

Figure 2:
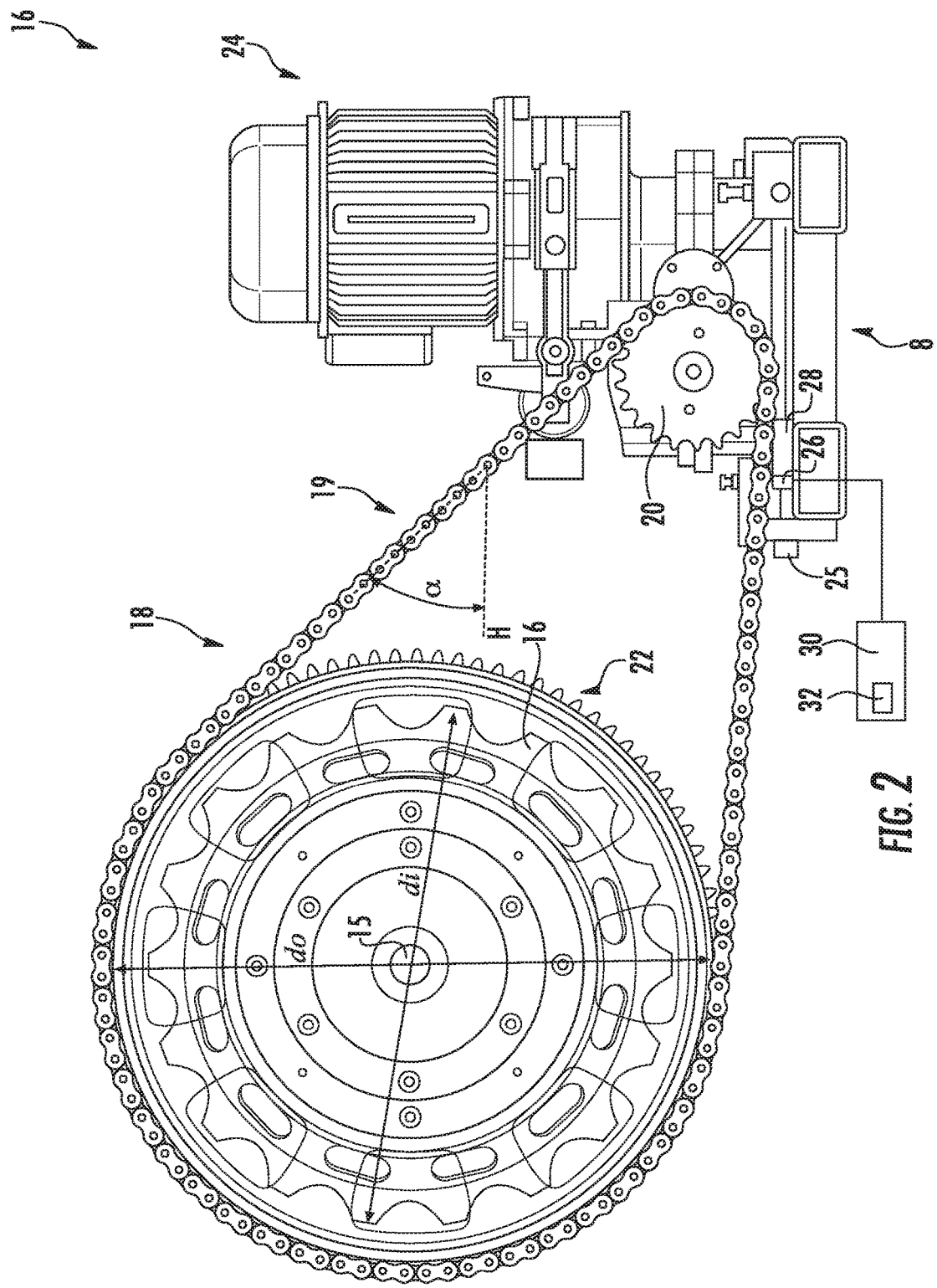
FIG. 2 shows an enlarged view of the interface between the drive unit and a sprocket which is configured for driving the conveying band of the people conveyor.
Figure 3:
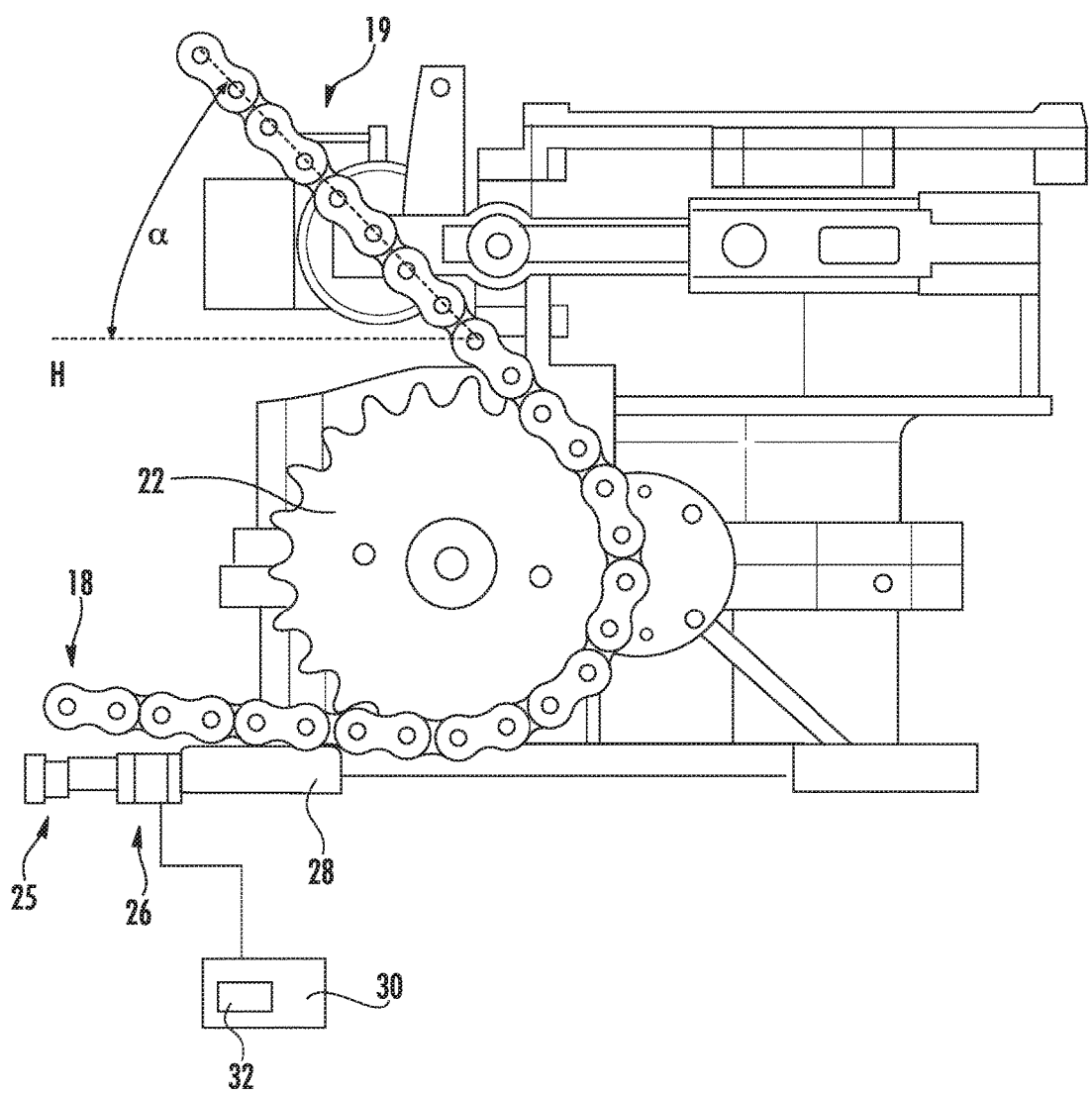
FIG. 3 shows an enlarged detail of the lower portion of the drive unit, which is supported on the truss of the people conveyor.

FIG. 2 shows an enlarged view of the connection between the drive unit 14 and the conveying chain sprocket 16, and FIG. 3 shows an enlarged detail of the lower portion of the drive unit 14, which is supported on a portion of the truss 8 of the people conveyor 10.

The drive unit 14 comprises a motor 24, in particular an electrical motor 24, which is configured for driving a first chain drive sprocket 20. A second drive chain sprocket 22 is mounted to the rotating shaft 15 together with the conveying chain sprocket 16 so that the second drive chain sprocket 22 and the conveying chain sprocket 16 rotate integrally with each other.

A transmission element 18, which in the illustrated embodiment is a drive chain 18, extends between and is in engagement with the first and second drive chain sprockets 20, 22. As a result, the second drive chain sprocket 22 and the conveying chain sprocket 16 are rotated via the drive chain 18 when the motor 24 is operated rotating the first drive chain sprocket 20. The conveying chain sprocket 16 is in engagement with the conveying chain 17, which is not shown in FIGS. 2 and 3, so that the conveying chain 17 is driven when the motor 24 operates.

Alternatively to the chain drive provided by the first and second chain drive sprockets 20, 22 and the drive chain 18, as illustrated in FIGS. 2 and 3, other types of transmission may be used, e.g. a belt drive or a cogged belt drive.

The drive unit 14 has a base 28 which is formed at the bottom of the drive unit 14 and supported by the truss 8. An adjustment bolt 25 abuts against the base 28 restricting the movement of the drive unit 14 in the longitudinal (horizontal) direction, which extends horizontally from left to right in FIGS. 1 to 3. Adjusting the position of the adjustment bolt 25 in the longitudinal direction allows adjusting the position of the drive unit 14 in the longitudinal direction. It in particular allows generating an appropriate tension of the drive chain 18. An appropriate tension of the drive chain 18 ensures a reliable operation of the chain drive formed by the first and second drive chain sprockets 20, 22 and the drive chain 18.

A force sensor 26, in particular a commercially available load cell 26, is arranged between the adjustment bolt 25 and the base 28 of the drive unit 14. The force sensor 26 is configured for measuring the force $F_{sensor}$ exerted by the drive unit 14 on the adjustment bolt 25/truss 8 in the longitudinal direction, and for providing a corresponding output signal.

More than one adjustment bolt 25, each adjustment bolt 25 being associated with a corresponding force sensor 26, may be employed. For example, an adjustment bolt 25 associated with a corresponding force sensor 26 may be provided at both lateral sides (left and right side) of the people conveyor 10, respectively.

The force sensor 26 is electrically connected to an evaluation unit 30, which is configured for calculating the load of the motor 24 from the output signal provided by the force sensor 26.

The evaluation unit 30 in particular is configured for calculating the load of the people conveyor 10, in particular the load of passengers (not shown) residing on the conveying elements 13, from the output signal provided by the force sensor 26.

According to Newton's third law ("action equals reaction"), the force $F_{sensor}$ detected by the force sensor 26 is proportional to the force exerted by the motor 24 onto the conveying band 12, which is proportional to the load $F_{load}$ of the people conveyor 10.

The load $F_{load}$ in particular is:

$$F_{load}=(d_o/d_i)*[(F_{sensor}-F_0)/\cos(\alpha)-F_0],$$

wherein $F_{sensor}$ is the force measured by the force sensor 26;

$d_i$ is the diameter of the conveying chain sprocket 16;

$d_o$ is the diameter of the second chain drive sprocket 22;

$F_0$ is a static pre-tension force applied for tensioning the drive chain 18; and $\alpha$ is the angle between the upper portion 19 of the drive chain 18 and the horizontal H $d_o/d_i$ represents the gear transmission ratio, which results from the different diameters $d_i$, $d_o$ of the conveying chain sprocket 16 and the second chain drive sprocket 22.

The factor $1/\cos(\alpha)$ compensates for the fact that the force sensor 26 detects the force $F_{sensor}$ acting in the longitudinal (horizontal) direction, whereas the load $F_{load}$ is acting parallel to the upper portion 19 of the drive chain 18, which is oriented at an angle $\alpha$ with respect to the horizontal H. The skilled person will understand that a modified factor is to be used in case the adjustment bolt 25 is not oriented horizontally but in an inclined orientation so that the force sensor 26 detects a force $F_{sensor}$ acting not in a horizontal but in an inclined direction.

Optionally, the evaluation unit 30 may be configured for triggering an alarm and/or for stopping further operation of the motor 24 in case the calculated load $F_{load}$ exceeds a predetermined limit $F_{limit}$. The evaluation unit 30 in particular may be configured for triggering an alarm in case the calculated load $F_{load}$ exceeds a first predetermined limit $F_{limit1}$ and for stopping further operation of the motor 24 in case the calculated load $F_{load}$ exceeds a second predetermined limit $F_{limit2}>F_{limit1}$. The evaluation unit 30 may be configured for triggering an alarm and/or for stopping further operation of the motor 24 only if the corresponding limit is exceeded for more than a predetermined period of time and/or more than a predetermined number of times.

The evaluation unit 30 may comprise a memory unit 32, which is configured for storing the measured force values and/or the calculated load values. This allows storing the measured force values and/or the calculated load values for later evaluation. It in particular allows to investigate the previous operation of the people conveyor 10 in case of a malfunction, e.g. in order to determine whether and to which extend a predetermined maximum load was exceeded. Alternatively or additionally, the measured force values and/or the calculated load values may be stored in a virtual cloud.

A number of optional features are set out in the following. These features may be realized in particular embodiments, alone or in combination with any of the other features.

In an embodiment the people conveyor may further comprise an evaluation unit which is configured for evaluating the force measured by the at least one force sensor for calculating the load of the motor. The evaluation unit in particular may be configured for evaluating the force measured by the at least one force sensor for calculating the load of passengers residing on the conveying elements forming the conveying band.

A force sensor in combination with an evaluation unit according to exemplary embodiments of the invention provides a reliable and cost efficient way of determining the load of the people conveyor, in particular the load of passengers residing on the conveying elements of the conveying band. In particular, there is no need for measuring the motor power, which would need additional dedicated equipment which is expensive and would need additional installation space.

In an embodiment the evaluation unit may be configured for triggering an alarm and/or for stopping the operation of the motor in case the calculated load exceeds a predetermined limit. A method according to an exemplary embodiment of the invention may include comparing the determined load with a predetermined limit and triggering an alarm and/or stopping the motor in case the calculated load exceeds a predetermined limit. This is an important safety feature in order to avoid risks for the passengers, which may result from using an overloaded passenger conveyor. It further prevents the people conveyor, in particular the motor of the people conveyor, from being damaged due to overload operation.

The method in particular may include triggering an alarm in case the calculated load exceeds a first predetermined limit and for stopping further operation of the motor in case the calculated load exceeds a second predetermined limit, which is larger than the first limit. Such a configuration allows avoiding an undesirable emergency stop of the people conveyor due to overload as it allows reducing the load or at least not further increasing the load in case the load exceeds the first predetermined threshold.

In order to avoid false alarms, the evaluation unit may be configured for triggering an alarm and/or stopping further operation of the motor only if the corresponding limit is exceeded for more than a predetermined period of time and/or more than a predetermined number of times.

In an embodiment the evaluation unit may comprise a memory unit which is configured for storing the calculated load values, and a method according to an exemplary embodiment of the invention may include storing the calculated load values. A memory unit allows storing measured force values and/or calculated load values for later evaluation. It in particular allows investigating the previous operation of the people conveyor in case a malfunction has occurred, e.g. in order to determine whether and to what extent a predetermined maximum load was exceeded. Alternatively or additionally, the measured force values and/or the calculated load values may be stored in a virtual cloud.

In an embodiment the conveying chain may be driven by a conveying chain sprocket. A conveying chain provides an appropriate and reliable means for driving the conveying chain sprocket.

In an embodiment the conveying chain sprocket may be driven by a chain drive comprising a first chain drive sprocket connected with the motor, a second chain drive sprocket connected with the conveying chain sprocket, and a drive chain which is in engagement with the first chain drive sprocket and with the second chain drive sprocket. A chain drive provides an appropriate and reliable means for driving the conveying chain sprocket.

In an embodiment the second chain drive sprocket may have a different diameter than the conveying chain sprocket for providing an additional gear transmission ratio.

In an embodiment the motor may be mounted to the truss using an adjustment bolt, wherein the force sensor is arranged at the adjustment bolt. An adjustment bolt allows adjusting the position of the drive unit in the longitudinal direction and generating an appropriate tension on the drive chain. An appropriate tension of the drive chain ensures a reliable operation of the chain drive, which is formed by the first and second drive chain sprockets and the drive chain. The adjustment bolt has been proven as a well suited location for arranging the force sensor. Since the adjustment bolt is movable, the force sensor may be installed and replaced easily by moving/adjusting the adjustment bolt.

More than one adjustment bolt, each adjustment bolt being associated with a corresponding force sensor, may be employed. For example, an adjustment bolt, which is associated with a corresponding force sensor, may be provided at both lateral sides (left and right side) of the people conveyor, respectively.

In an embodiment the people conveyor may be an escalator comprising steps as conveying elements. In another embodiment, the people conveyor may be a moving walkway comprising pallets as conveying elements. A force sensor according to exemplary embodiments of the invention may be employed in escalators as well as in moving walkways for determining the load of the escalator or moving walkway, respectively.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the dependent claims.

REFERENCES 8 truss
10 people conveyor
11 landing portions
12 conveying band
13 conveying elements/steps
14 drive unit
15 rotating shaft
16 conveying chain sprocket
17 conveying chain
18 transmission element/drive chain
19 upper portion of the drive chain
20 first drive chain sprocket
22 second drive chain sprockets
24 motor
25 adjustment bolt
26 force sensor/load cell
28 base
30 evaluation unit
32 memory unit
$d_i$ diameter of the conveying chain sprocket
$d_o$ diameter of the second chain drive sprocket
$F_{load}$ load of the people conveyor
$F_{sensor}$ force measured by the force sensor
$F_0$ static pre-tension force
H horizontal
α angle between the upper portion of the drive chain and the horizontal

What is claimed is:

1. People conveyor comprising:
a conveying band including a plurality of conveying elements;
a truss supporting the conveying band;
a motor, which is mounted to the truss and which is configured for driving the conveying band;
at least one force sensor, which is arranged between the motor and the truss and configured for measuring a force which is exerted by the motor on the truss;
an evaluation unit, which is configured for evaluating the force measured by the at least one force sensor for calculating the load of the motor;
wherein the evaluation unit is configured for evaluating the force measured by the at least one force sensor for calculating the load of passengers residing on the conveying band.

2. People conveyor according to claim 1, wherein the evaluation unit is configured for triggering an alarm and/or for stopping the operation of the motor in case the calculated load exceeds a predetermined limit.

3. People conveyor according to claim 1, wherein the evaluation unit comprises a memory unit which is configured for storing the calculated load values.

4. People conveyor according to claim 1, wherein the motor is mounted to the truss using at least one adjustment bolt, wherein the at least one force sensor is arranged at the at least one adjustment bolt.

5. People conveyor according to claim 1, wherein the conveying band is driven by a conveying chain sprocket.

6. People conveyor according to claim 5, wherein the conveying chain sprocket is driven by a chain drive comprising a first chain drive sprocket connected with the motor, a second chain drive sprocket connected with the conveying chain sprocket, and a drive chain which is in engagement with the first chain drive sprocket and with the second chain drive sprocket.

7. People conveyor according to claim 6, wherein the second chain drive sprocket has a different diameter than the conveying chain sprocket.

8. People conveyor according to claim 1, wherein the people conveyor is an escalator and wherein the conveying elements are steps.

9. People conveyor according to claim 1, wherein the people conveyor is a moving walkway and wherein the conveying elements are pallets.

10. Method of determining a load of a people conveyor comprising a conveying band including a plurality of conveying elements; a truss supporting the conveying band; and a motor, which is mounted to the truss and configured for driving the conveying band;

wherein the method comprises measuring a force which is exerted by the motor on the truss when driving the conveying band;

wherein the method comprises installing a force sensor between the motor and the truss;

wherein the method comprises using an evaluation unit configured for evaluating the force measured by the at least one force sensor for calculating the load of passengers residing on the conveying band.

11. Method according to claim 10, wherein the method includes comparing the determined load with a predetermined limit and triggering an alarm and/or stopping the motor in case the calculated load exceeds a predetermined limit.

12. Method according to claim 10, wherein the method includes storing the calculated load values.

* * * * *